United States Patent
Singh et al.

(10) Patent No.: US 9,277,426 B1
(45) Date of Patent: Mar. 1, 2016

(54) METHOD AND APPARATUS FOR MANAGEMENT OF MEASUREMENT REPORT TRANSMISSION

(71) Applicant: Sprint Spectrum L.P., Overland Park, KS (US)

(72) Inventors: Jasinder P. Singh, Olathe, KS (US); Maneesh Gauba, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 139 days.

(21) Appl. No.: 13/874,873

(22) Filed: May 1, 2013

(51) Int. Cl.
*H04W 24/02* (2009.01)

(52) U.S. Cl.
CPC .................................... *H04W 24/02* (2013.01)

(58) Field of Classification Search
CPC ...................................................... H04B 1/00
See application file for complete search history.

(56) References Cited

U.S. PATENT DOCUMENTS

| | | | |
|---|---|---|---|
| 2006/0252377 A1 | 11/2006 | Jeong et al. | |
| 2007/0155387 A1 | 7/2007 | Li et al. | |
| 2008/0293423 A1 | 11/2008 | Park et al. | |
| 2009/0175292 A1* | 7/2009 | Noh et al. | 370/462 |
| 2009/0285158 A1* | 11/2009 | Rezaiifar et al. | 370/328 |
| 2010/0027492 A1* | 2/2010 | Asanuma | 370/329 |
| 2010/0103834 A1* | 4/2010 | Gorokhov et al. | 370/252 |
| 2010/0296467 A1* | 11/2010 | Pelletier et al. | 370/329 |
| 2013/0107704 A1* | 5/2013 | Dinan | 370/230 |

FOREIGN PATENT DOCUMENTS

WO   WO 95/19687   7/1995

* cited by examiner

*Primary Examiner* — Ayaz Sheikh
*Assistant Examiner* — Debebe Asefa

(57) ABSTRACT

Disclosed herein is a method and apparatus for managing transmission of air interface measurement reports from a UE to its serving base station. In accordance with the disclosure, a UE will generally transmit such measurement reports on subcarriers having particular subcarrier spacing. However, if and when the UE detects threshold poor air interface performance, such as threshold weak signal strength from its serving base station, the UE will responsively transition to instead transmit measurement reports to its serving base station on subcarriers having smaller subcarrier spacing.

20 Claims, 3 Drawing Sheets

METHOD AND APPARATUS FOR MANAGEMENT OF MEASUREMENT REPORT TRANSMISSION

BACKGROUND

Unless otherwise indicated herein, the information described in this section is not prior art to the claims is are not admitted to be prior art by inclusion in this section.

In a cellular wireless communication system, as a user equipment device (UE) operates within coverage of a cellular base station, it can be important for the UE to report air interface performance metrics to the base station from time to time. By way of example, the UE may regularly monitor signal strength and quality of reference signals being transmitted by its serving base station and by adjacent base stations and may report those metrics to the serving base station to facilitate handoff decisions and other adjustments in air interface communication. Further, if the UE reports threshold poor performance of transmissions from its serving base station, the serving base station may then direct the UE evaluate and report air interface performance from various other base stations, on various other frequencies, or the like, to facilitate handoff to better coverage, and the UE may responsively do so.

OVERVIEW

The air interface between a UE and its serving base station may span a frequency bandwidth divided into many subcarriers on which the UE may modulate data for communication to the base station. Thus, when the UE has data to transmit to the base station, the UE may modulate the data onto one or more subcarriers using varying levels of modulation, with each subcarrier carrying a symbol that represents a certain number of bits.

In general, the subcarriers of the air interface may be spaced apart from each other by a particular extent to help prevent interference between transmissions on adjacent subcarriers. For instance, in an air interface operating according to the well-known Long Term Evolution (LTE) protocol, subcarriers are generally spaced apart from each other by 15 kHz. However, on a recurring basis over time, certain groups of subcarriers on the air interface may be spaced more closely together. For instance, in an LTE system, certain recurring groups of subcarriers that define a physical random access channel (PRACH) may be spaced from each other by just 1.25 kHz instead of 15 kHz. Although this closer spacing of subcarriers may increase the risk of interference from adjacent transmissions, the random nature of transmissions on the PRACH may reduce the likelihood of adjacent transmission.

Disclosed herein is a method and apparatus for managing transmission of air interface measurement reports from a UE to its serving base station. In accordance with the disclosure, the UE will generally transmit such measurement reports on subcarriers having particular subcarrier spacing (e.g., subcarriers that are spaced from adjacent subcarriers by 15 kHz). However, if and when the UE detects threshold poor air interface performance, such as threshold weak signal strength from its serving base station, the UE will then responsively transition to transmit the measurement reports instead on subcarriers having smaller subcarrier spacing (e.g., subcarriers that are spaced from adjacent subcarriers by 1.25 kHz).

In an LTE system, for instance, the UE may generally transmit measurement reports on a physical uplink shared channel (PUSCH) and particularly on subcarriers that have 15 kHz spacing. But if and when the UE detects threshold poor air interface performance, the UE may then transition to transmitting measurement reports on the PRACH and particularly on subcarriers that have 1.25 kHz spacing.

Accordingly, in one respect, disclosed is a UE configured to transmit radio frequency (RF) measurement reports over an air interface from the UE to a serving base station, where the air interface defines a first group of subcarriers with first subcarrier spacing and a second group of subcarriers with second subcarrier spacing less than the first subcarrier spacing. In accordance with the disclosure, the user is then further configured to transmit the RF measurement reports on subcarriers of the first group by default but to transmit the RF measurement reports instead on subcarriers of the second group in response to the UE determining that performance of the air interface is threshold poor.

In another respect, disclosed is a UE that is configured to communicate with a base station via a primary air interface defining a primary downlink from the base station to the UE and a primary uplink from the UE to the base station, where the primary uplink defines, on a recurring basis over time, a first group of subcarriers with first subcarrier spacing and a second group of subcarriers with second subcarrier spacing less than the first subcarrier spacing. In accordance with the disclosure, the UE is then further configured to measure performance of at least one air interface including performance of the primary downlink, and to transmit to the base station, via the primary uplink, measurement reports indicating the measured air interface performance. Moreover, the UE has a first mode of operation in which the UE transmits the measurement reports on subcarriers of the first group, the UE has a second mode of operation in which the UE transmits the measurement reports on subcarriers of the second group, and the UE is configured to dynamically switch between operating in the first mode and operating in the second mode based on the measured performance of the primary downlink.

And in still another respect, disclosed is a method for managing transmission of RF measurement reports from a UE to a serving base station, where the UE and serving base station wirelessly communicate with each other via an air interface defining a downlink from the base station to the UE and an uplink from the UE to the base station, with the uplink defining, on a recurring basis over time, a first group of subcarriers with first subcarrier spacing and a second group of subcarriers with second subcarrier spacing less than the first subcarrier spacing. The method may then involve the UE measuring performance of the downlink and making a determination of whether the measured performance of the downlink is threshold low. Further the method may involve (i) if the determination is that the measured performance of the downlink is not threshold low, the UE transmitting an RF measurement report to the serving base station on a subcarrier of the first group rather than on any subcarrier of the second group and (ii) if the determination is that the measured performance of the primary downlink is threshold low, the UE transmitting the measurement report to the serving base station on a subcarrier of the second group rather than on any subcarrier of the first group.

These as well as other aspects, advantages, and alternatives will become apparent to those of ordinary skill in the art by reading the following detailed description, with reference where appropriate to the accompanying drawings. Further, it should be understood that the description provided in this overview and elsewhere in this document is provided by way of example only.

DETAILED DESCRIPTION

Example Network and UE Arrangement

Figure 1:
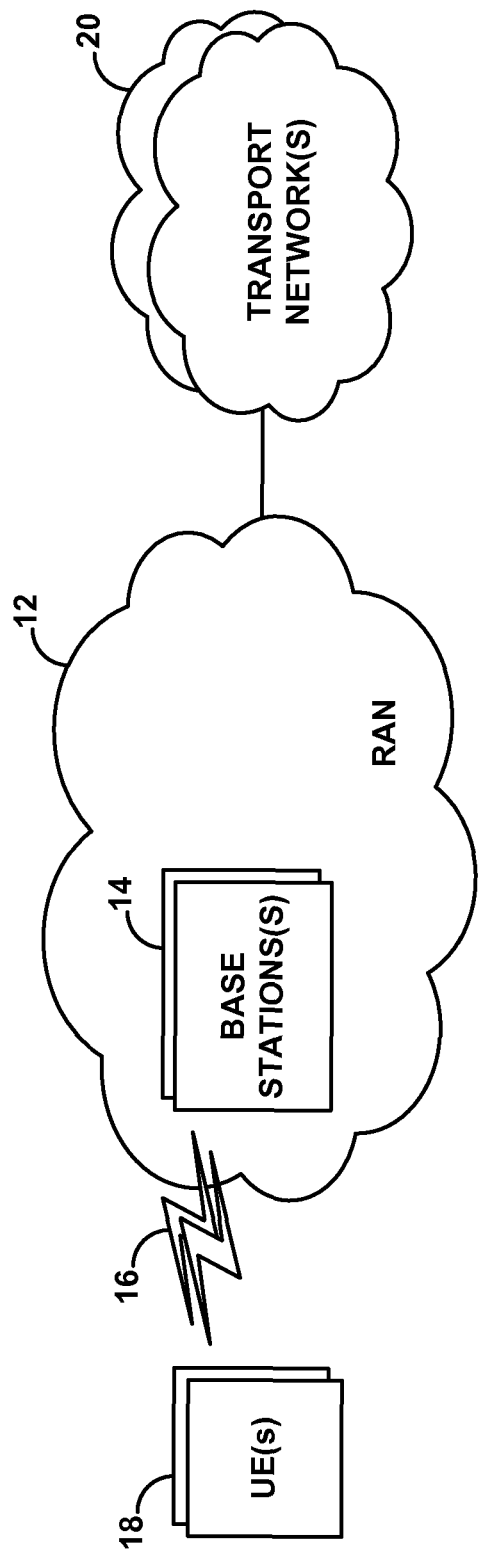
FIG. 1 is a simplified block diagram of a wireless communication system in which the present method can be implemented.

Referring to the drawings, as noted above, FIG. 1 is a simplified block diagram of a wireless communication system in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example communication system as including at its core a radio access network (RAN) 12 having various base stations 14 that are each arranged to communicate over a respective RF air interface with UEs 18. RAN 12 then provides connectivity with one or more transport networks 20, such as the public switched telephone network (PSTN) or the Internet for instance. With this arrangement, a UE 18 that is positioned within coverage of a given base station and that is suitably equipped may work with the base station to acquire a radio link layer connection with the base station and may then engage in air interface communication with the base station and in turn with various remote entities on the transport network(s) and/or with other UEs served by the RAN.

Figure 2:
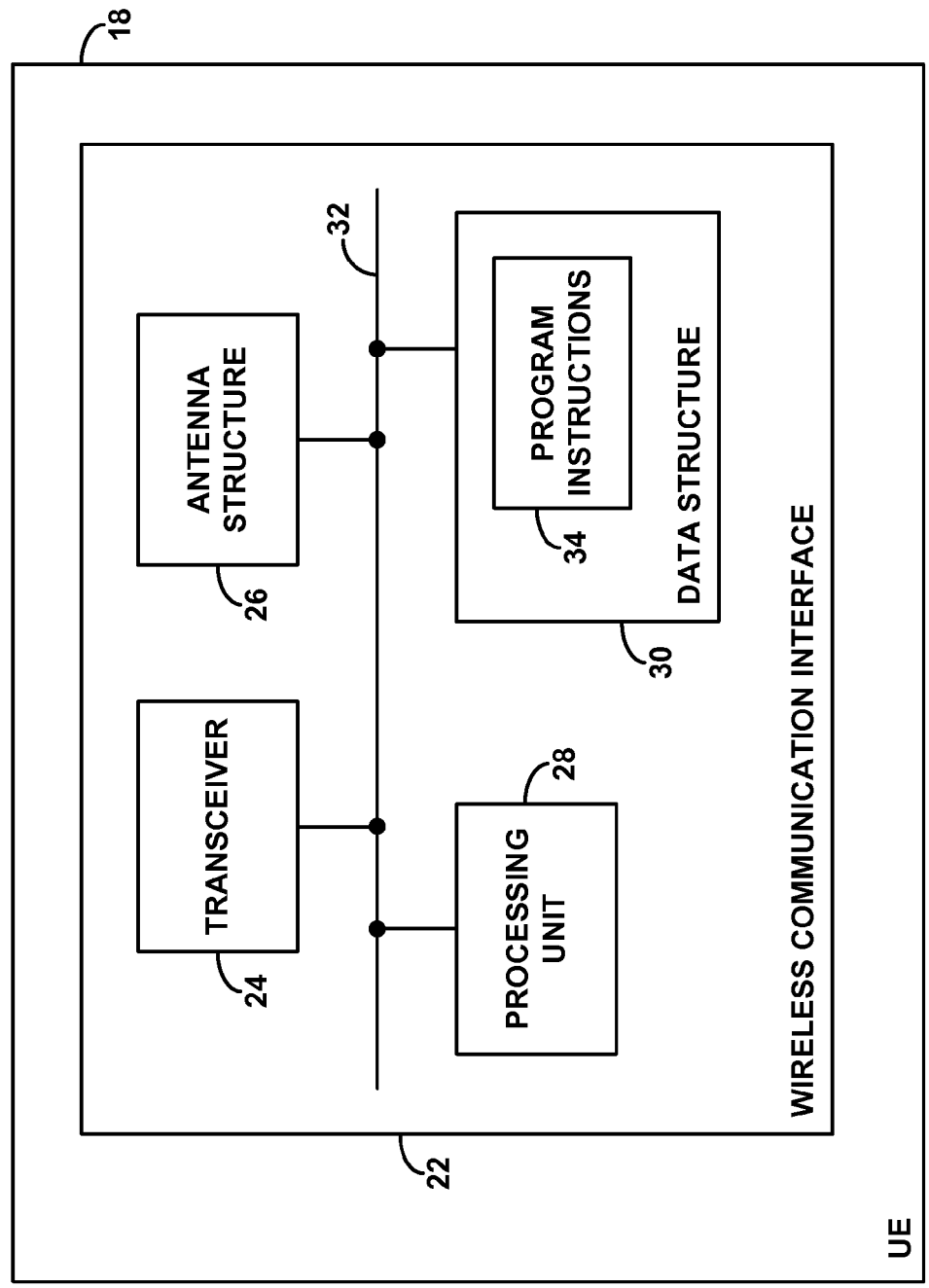
FIG. 2 is a simplified block diagram of a UE arranged to implement the method.

FIG. 2 is next a simplified block diagram of an example UE 18, illustrating some of the functional components that can be included in such a device. In practice, this UE may be any of a variety of devices arranged to be served by the base station and to carry out various functions described herein. By way of example, the UE may be a cellular telephone, a wirelessly equipped personal computer or tablet computer, an embedded wireless communication module, or any other wirelessly-equipped device. Further, notwithstanding the label "user equipment device", the device may or may not be "user" operable, or may or may not be readily user operable.

As shown in FIG. 2, the example UE includes a wireless communication interface 22, which is shown including a transceiver 24, an antenna structure 26, a processing unit 28, and data storage 30, some or all of which may be coupled together by a system bus, network, or other connection mechanism 32. In practice, the wireless communication interface 22 may include a chipset integrated with other UE components, such as user interface components or the like, all of which may be contained within a UE housing. In an alternative embodiment, note that various components shown as being part of the wireless communication interface could be provided elsewhere in the UE. For instance, the processing unit 28 could include a host processor of the UE. Other variations are possible as well.

In the example UE, transceiver 24 and antenna structure 26 may be arranged to engage in air interface communication with various base stations of RAN 12 in accordance with an agreed air interface protocol, examples of which include Orthogonal Frequency Division Multiple Access (e.g., LTE or Wireless Interoperability for Microwave Access (WiMAX)), Code Division Multiple Access (CDMA), Global System for Mobile Communications (GSM), IDEN, GPRS, UTMS, EDGE, MMDS, WIFI, BLUETOOTH, and/or other protocols now known or later developed. By way of example, this description will assume that the UE and RAN engage in LTE communication, modified in accordance with the present method.

Processing unit 28 may function to control transceiver 24, so as to cause transceiver 24 to engage in certain transmissions and transmissions of certain types. As such, processing unit 28 may comprise one or more general purpose processors (e.g., microprocessors) and/or special purpose processors (e.g., application specific integrated circuits) and may be integrated in whole or in part with transceiver 24.

And data storage 30 may comprise one or more volatile and/or non-volatile storage components (e.g., EEPROM storage) and may hold program instructions (e.g., software or firmware) 34 executable by processing unit 28 to carry out various functions described herein, such as to receive and evaluate information from transceiver 24 and to control operational parameters and functions of transceiver 24. By way of example, the program instructions 34 may be executable by the processing unit 28 to evaluate strength and/or quality of signals received from various base stations including a serving base station, or to receive from the transceiver such measurements of air interface performance. Further, the program instructions may be executable by the processing unit to generate and output RF measurement reports for transmission by transceiver 24 to a serving base station.

Still further, the program instructions may be executable by the processing unit to determine that the strength and/or quality of air interface communication from the serving base station is threshold low and, in response to that determination, to cause the transceiver to transition from transmitting RF measurement reports to the serving base station on subcarriers having particular subcarrier spacing to transmitting the RF measurement reports to the serving base station (in the same coverage area) instead on subcarriers having smaller subcarrier spacing. For instance, the program instructions may be executable by the processing unit to cause the transceiver to switch from transmitting the measurement reports on subcarriers spaced 15 kHz from adjacent subcarriers to transmitting measurement reports instead on subcarriers spaced 1.25 kHz from adjacent subcarriers.

Example Air Interface Configuration

In a representative LTE system, the air interface on both the downlink and the uplink may span a particular bandwidth (such as 5 MHz, 10 MHz, or 20 MHz) that is divided primarily into subcarriers that are spaced apart from each other by 15 kHz. Further, the air interface may be divided over time into a sequence of 10 millisecond frames, with each frame being further divided into ten 1 millisecond subframes that are in turn divided into two 0.5 millisecond segments. In each 0.5 millisecond segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus supporting transmission of 12 OFDM symbols in respective "resource elements." Thus, a UE may transmit symbols to the base station in these resource elements, particularly on subcarriers that are spaced apart from each other by 15 kHz and in time segments spanning 67 μs each.

An LTE air interface may also define various channels, each spanning certain resource blocks and resource elements. For instance, on the downlink (for communication from the base station to UEs), certain resource elements in each resource block may be reserved to define a physical downlink shared channel (PDSCH) for carrying bearer data from the base station to UEs, and other resource elements may be reserved to define a physical downlink control channel (PDCCH) for carrying control signals such as resource allocations from the base station to UEs. Further, certain resource elements per downlink resource block may be reserved to define a reference signal that UEs can monitor as a basis to evaluate strength and/or quality of coverage.

Similarly, on the uplink (for communication from UEs to the base station), certain resource elements in each resource block may be reserved to define a physical uplink shared channel (PUSCH) for carrying bearer data from UEs to the base station, and other resource elements may be reserved to define a physical uplink control channel (PUSCH) for carrying control signals such as resource requests from UEs to the base station. Further, certain resource blocks may be reserved to define a physical random access channel (PRACH) for carrying access probes from UEs to the base station.

In particular, depending on LTE configuration, the PRACH may be provided in one or two subframes per frame, and in each subframe in just certain resource blocks, such as up to six resource blocks for instance. For instance, in an example LTE configuration, the first six resource blocks in the second subframe of each frame may be set aside as PRACH resource blocks.

As noted above, although the subcarriers in a representative LTE air interface are generally spaced apart from each other by 15 kHz, the subcarriers of the PRACH are instead spaced apart from each other by just 1.25 kHz instead of 15 kHz. Thus, in the example LTE configuration noted above, resource blocks throughout the air interface may have subcarriers spaced apart from each other by 15 kHz, but the first six resource blocks in the second subframe of each frame may instead have subcarriers spaced apart from each other by just 1.25 kHz.

Example Operation

Figure 3:
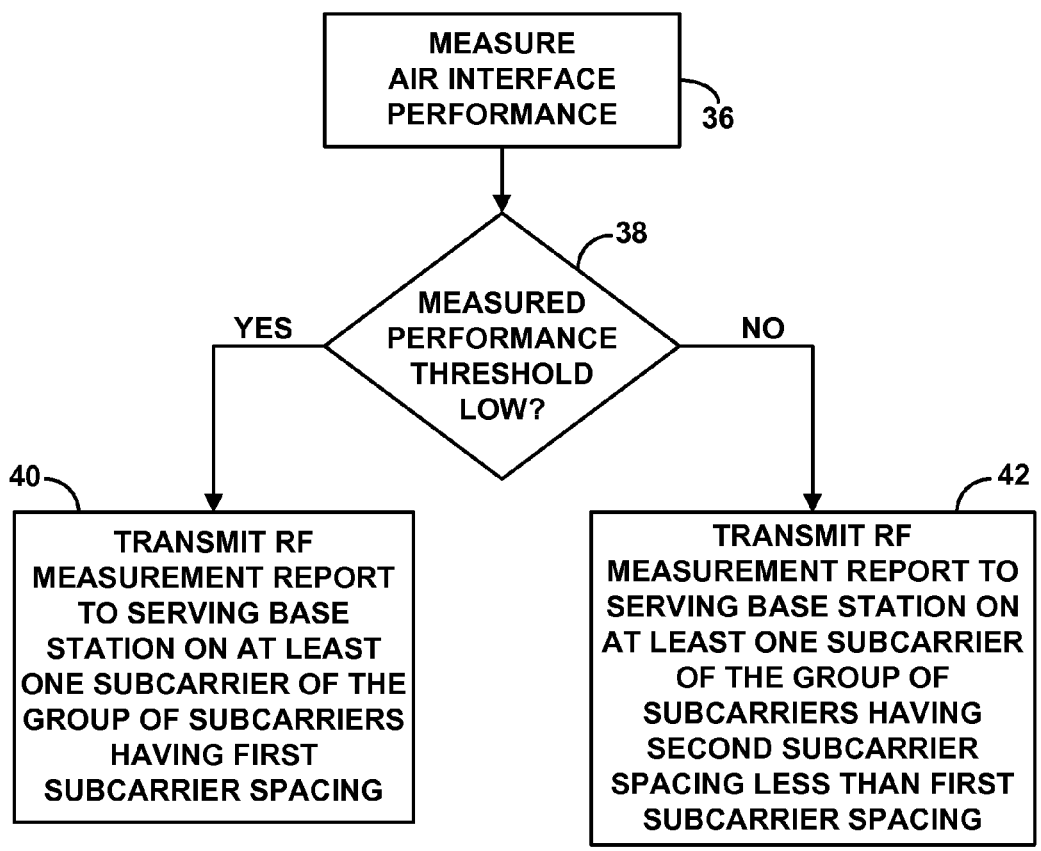
FIG. 3 is a flow chart depicting functions that can be carried out in accordance with the method.

FIG. 3 is next a flow chart depicting functions that can be carried out in accordance with the present method. In practice, these functions may be carried out by a UE such as that depicted in FIG. 2, in a scenario where the UE and serving base station wirelessly communicate with each other via an air interface defining a downlink from the base station to the UE and an uplink from the UE to the base station, and where the uplink defines, on a recurring basis over time, a first group of subcarriers with first subcarrier spacing and a second group of subcarriers with second subcarrier spacing less than the first subcarrier spacing.

As a specific example, but without limitation, the scenario may be where the UE and serving base station communicate with each other via an LTE or other OFDMA air interface as described above. Thus, the first group of subcarriers may be those that are not part of the PRACH but are perhaps part of the PUSCH, and the first subcarrier spacing may be 15 kHz. Whereas, the second group of subcarriers may be those that are part of the PRACH, and the second subcarrier spacing may be 1.25 kHz.

As shown in FIG. 3, at block 36, the method involves the UE measuring performance of the downlink. To do this, by way of example, the UE may receive a reference signal transmitted by the base station as noted above, the UE may evaluate that signal to determine as the measured performance a Reference Signal Receive Power (RSRP), a Reference Signal Receive Quality (RSRQ) such as signal-to-noise ratio for instance, and/or some combination of those two measures. In practice, the UE may regularly carry out this measurement function, and this method may make use of the latest measurement.

At block 38, the method then involves the UE making a determination of whether the measured performance of the downlink is threshold low. For example, if the UE had determined the measured performance as a particular RSRP, the UE may compare that RSRP with a predefined threshold power level to determine whether the measured RSRP is below that threshold and if so may conclude that the measured performance of the downlink is threshold low but otherwise may conclude that the measured performance of the downlink is not threshold low.

If the UE determines that the measured performance of the downlink is not threshold low, then the method continues at block 40, where the UE then transmits an RF measurement report to the serving base station on at least one subcarrier of the first group rather than on any subcarrier of the second group. On the other hand, if the UE determines that the measured performance of the downlink is threshold low, then the method continues at block 42, the where the UE instead transmits the RF measurement report to the serving base station on at least one subcarrier of the second group rather than on any subcarrier of the first group.

In practice, the measurement report that the UE transmits to the serving base station may be a measurement report specifying a measured RSRP and/or RSRQ that the UE detected from the serving base station and/or a measured RSRP and/or RSRQ that the UE detected respectively from each of one or more other base stations. As noted above, the UE may be arranged to establish these measurements regularly and/or in response to requests from the serving base station, and the particular measurement report at issue may be a next measurement report that the UE is to transmit. The measurement report may contain one or more measurements as a code or the like defining the measurement and an identifier of the base station at issue, in a manner that the serving base station and/or other network infrastructure is arranged to understand.

In the LTE example noted above, the function of block 40 would involve transmitting the measurement report on a subcarrier that is spaced from adjacent subcarriers by 15 kHz, such as on a subcarrier that is not part of the PRACH but instead part of the PUSCH for instance. Whereas, the function of block 42 would involve transmitting the measurement report on a subcarrier that is spaced from adjacent subcarriers by just 1.25 kHz, such as on a subcarrier that is part of the PRACH. In line with the discussion above, the UE may perform this transmission by modulating the data representing the measurement report, using a quadrature amplitude modulation method for instance, and transmitting the resulting modulated signal over the air for receipt by the serving base station.

In practice, certain ones of the PRACH subcarriers may be reserved for use to carry RF measurement reports like this, and so the UE may perform the transmission on one or more such subcarriers and the base station may receive and process the measurement reports accordingly. Alternatively, the UE may randomly select one or more PRACH subcarriers on which to perform the measurement report transmission, and the base station may still receive the transmission, demodulate the transmission to uncover the measurement report, and process the measurement report.

In the method as depicted by FIG. 3, the UE and base station may be considered to communicate with each other over a primary air interface link defining a primary downlink from the base station to the UE and a primary uplink from the UE to the base station. Thus, the primary uplink may define, on the recurring basis over time, the first group of subcarriers with the first subcarrier spacing and the second group of subcarriers with the second subcarrier spacing less than the first subcarrier spacing. In addition, the UE may be configured to measure performance of at least one air interface, including performance of the primary downlink but also possibly including performance of downlinks from one or more other base stations, and the UE may be configured to transmit to the base station, via the primary uplink, measurement reports indicating the measured air interface performance.

With that arrangement, the UE may thus have a first mode of operation in which the UE transmits the measurement reports on subcarriers of the first group, and a second mode of operation in which the UE transmits the measurement reports on subcarriers of the second group. And the UE may be configured to dynamically switch between operating in the first mode and operating in the second mode based on the measured performance of the primary downlink. For instance, the UE may be configured to normally transmit measurement reports on subcarriers of the first group, but to instead transmit measurement reports on subcarriers of the second group in response to the UE determining that the measured performance of the primary downlink is threshold low.

Exemplary embodiments have been described above. It should be understood, however, that variations from these embodiments are possible, while remaining within the true spirit and scope of the invention.

We claim:

1. A user equipment device (UE) configured to transmit radio frequency (RF) measurement reports over an air interface from the UE to a serving base station, wherein the air interface defines a first group of subcarriers with first spacing between adjacent subcarriers of the first group and a second group of subcarriers with second spacing between adjacent subcarriers of the second group, wherein the second spacing is less than the first spacing,
wherein the UE is further configured to transmit the RF measurement reports on subcarriers of the first group by default but to transmit the RF measurement reports instead on subcarriers of the second group in response to the UE determining that performance of the air interface is threshold poor.

2. The UE of claim 1, wherein the UE is further configured to measure the performance of the air interface and to determine whether the measured performance is threshold poor.

3. The UE of claim 2, wherein the measured performance of the air interface comprises a Reference Signal Receive Power (RSRP) of the air interface.

4. The UE of claim 2, wherein the measured performance of the air interface comprises a Reference Signal Receive Quality (RSRQ) of the air interface.

5. The UE of claim 1, wherein the air interface is an Orthogonal Frequency Division Multiple Access (OFDMA) air interface.

6. The UE of claim 5, wherein the first spacing is 15 kHz, and wherein the second spacing is 1.25 kHz.

7. The UE of claim 1, wherein the UE is a cellular telephone.

8. A user equipment device (UE) configured to communicate with a base station via a primary air interface defining a primary downlink from the base station to the UE and a primary uplink from the UE to the base station, wherein the primary uplink defines, on a recurring basis over time, a first group of subcarriers with first spacing between adjacent subcarriers of the first group and a second group of subcarriers with second spacing between adjacent subcarriers of the second group, wherein the second spacing is less than the first spacing,
wherein the UE is further configured to measure performance of at least one air interface including performance of the primary downlink, and to transmit to the base station, via the primary uplink, measurement reports indicating the measured air interface performance, and
wherein the UE has a first mode of operation in which the UE transmits the measurement reports on subcarriers of the first group, the UE has a second mode of operation in which the UE transmits the measurement reports on subcarriers of the second group, and the UE is configured to dynamically switch between operating in the first mode and operating in the second mode based on the measured performance of the primary downlink.

9. The UE of claim 8, wherein the measured performance of the primary downlink comprises a Reference Signal Receive Power (RSRP) of the primary downlink.

10. The UE of claim 8, wherein the measured performance of the primary downlink comprises a Reference Signal Receive Quality (RSRQ) of the primary downlink.

11. The UE of claim 8, wherein the primary air interface is an Orthogonal Frequency Division Multiple Access (OFDMA) air interface.

12. The UE of claim 11, wherein the first spacing is 15 kHz, and wherein the second spacing is 1.25 kHz.

13. The UE of claim 8, wherein the UE is configured to normally transmit the measurement reports on subcarriers of the first group, but to instead transmit the measurement reports on subcarriers of the second group in response to the UE determining that the measured performance of the primary downlink is threshold low.

14. The UE of claim 13, wherein the measured performance of the primary downlink comprises a Reference Signal Receive Power (RSRP) of the primary downlink.

15. The UE of claim 8, wherein the UE comprises a cellular telephone.

16. A method for managing transmission of radio frequency (RF) measurement reports from a user equipment device (UE) to a serving base station, wherein the UE and serving base station wirelessly communicate with each other via an air interface defining a downlink from the base station to the UE and an uplink from the UE to the base station, wherein the uplink defines, on a recurring basis over time, a first group of subcarriers with first spacing between adjacent subcarriers of the first group and a second group of subcarriers with second spacing between adjacent subcarriers of the second group, wherein the second spacing is less than the first spacing, the method comprising:
the UE measuring performance of the downlink;
the UE making a determination of whether the measured performance of the downlink is threshold low;
if the determination is that the measured performance of the downlink is not threshold low, then the UE transmitting an RF measurement report to the serving base station on at least one subcarrier of the first group rather than on any subcarrier of the second group; and if the determination is that the measured performance of the primary downlink is threshold low, then the UE transmitting the measurement report to the serving base station on at least one subcarrier of the second group rather than on any subcarrier of the first group.

17. The method of claim 16, wherein the measured performance of the downlink comprises a Reference Signal Receive Power (RSRP) of the downlink.

18. The method of claim 16, wherein the measured performance of the downlink comprises a Reference Signal Receive Quality (RSRQ) of the downlink.

19. The method of claim 16, wherein the air interface is an Orthogonal Frequency Division Multiple Access (OFDMA) air interface.

20. The method of claim 19, wherein the first spacing is 15 kHz, and wherein the second spacing is 1.25 kHz.

* * * * *